United States Patent
Thøgersen

(10) Patent No.: US 8,323,600 B2
(45) Date of Patent: Dec. 4, 2012

(54) METHOD AND CATALYST FOR REMOVAL OF NITROGEN OXIDES IN A FLUE GAS

(75) Inventor: Joakim Reimer Thøgersen, Kokkedal (DK)

(73) Assignee: Haldor Topsoe A/S, Lyngby (DK)

( * ) Notice: Subject to any disclaimer, the term of this patent is extended or adjusted under 35 U.S.C. 154(b) by 24 days.

(21) Appl. No.: 13/128,267

(22) PCT Filed: Nov. 27, 2009

(86) PCT No.: PCT/EP2009/008466
§ 371 (c)(1), (2), (4) Date: May 9, 2011

(87) PCT Pub. No.: WO2010/066345
PCT Pub. Date: Jun. 17, 2010

(65) Prior Publication Data
US 2011/0217221 A1    Sep. 8, 2011

(30) Foreign Application Priority Data

Dec. 8, 2008 (DK) .................................. 2008 01734
Mar. 20, 2009 (DK) .................................. 2009 00391

(51) Int. Cl.
*B01D 53/56* (2006.01)
*B01D 53/94* (2006.01)
*B01J 32/00* (2006.01)
*B01J 35/00* (2006.01)
*B01J 29/00* (2006.01)

(52) U.S. Cl. .......... 423/213.2; 423/239.2; 423/DIG. 27; 60/299; 60/301; 502/300; 502/325; 502/527.11; 502/527.24; 502/60; 502/66; 502/69

(58) Field of Classification Search ............... 423/213.2, 423/239.2, DIG. 27; 60/299, 301; 502/300, 502/325, 527.11, 527.24, 60, 66, 69
See application file for complete search history.

(56) References Cited

U.S. PATENT DOCUMENTS

| | | | | |
|---|---|---|---|---|
| 3,910,770 A | * | 10/1975 | Kobylinksi et al. | 422/172 |
| 5,272,876 A | * | 12/1993 | Sheller | 60/300 |
| 5,308,591 A | * | 5/1994 | Whittenberger | 422/174 |
| 2005/0042151 A1 | | 2/2005 | Alward et al. | |
| 2008/0202107 A1 | | 8/2008 | Boorse et al. | |

FOREIGN PATENT DOCUMENTS

EP   1 582 248 A1   10/2005
WO   WO 2008/094889 A1   8/2008

* cited by examiner

Primary Examiner — Timothy Vanoy
(74) Attorney, Agent, or Firm — Dickstein Shapiro LLP

(57) ABSTRACT

The invention relates to a method and a catalyst for removal of nitrogen oxides in a flue gas from a combustion engine or gas turbine by injecting a reducing agent and reducing the nitrogen oxides in the presence of a catalyst. The catalyst is a zeolite based catalyst on a corrugated monolithic substrate, the substrate has a density of 50-300 g/l and a porosity of at least 50%. The monolithic substrate is a paper of high silica content glass or a paper of E-glass fiber with a layer of diatomaceous earth or a layer of titania, and the catalyst is a Fe-β zeolite.

15 Claims, 4 Drawing Sheets

METHOD AND CATALYST FOR REMOVAL OF NITROGEN OXIDES IN A FLUE GAS

The invention relates to removal of nitrogen oxides, $NO_x$, from exhaust gases and flue gases from combustion engines and gas turbines.

The invention is specifically directed to a catalytic process for $NO_x$ removal with a catalyst comprising zeolite on a monolithic substrate.

Methods for removing nitrogen oxides from combustion engines exhaust gases are known in the art.

JP 2000/246111 discloses a zeolite catalyst on a porous substrate. The substrate is prepared by forming a gel of alumina silica on an oxide support. The gel is then dried, baked and the zeolite can then be applied without peeling.

U.S. Pat. No. 7,431,904 B2 discloses a process for catalytic reduction of nitrogen oxides in a flue gas by reduction with ammonia. The catalyst is supported by a monolithic structure comprising titania in the form of anatase and diatomaceous earth. The catalyst comprises a layer of oxides or sulphates of V, W, Mn, Nb, Mo, Ni, Fe or Cu, or of Pt or Pd. These compounds are expensive, and the catalyst is expected to operate below 500° C., but none of the components are ideal for operation at high temperature due to ammonia oxidation activity.

Another method for purifying exhaust gas by $NO_x$ removal is described by European Patent Number EP 0 667 181B1. By this method, nitrogen oxides are catalytically reduced by injection of ammonia acetate. The catalyst is a synthetically produced zeolite (mordenite) containing iron. The catalyst may also comprise Pt, Rh or Pd to obtain that CO is oxidized. The zeolite may be applied on a monolithic catalyst carrier, which is either ceramic or metallic or transformed into a monolithic body. The catalyst has been shown to possess improved activity only up to 350° C. compared to vanadium/titania based catalysts.

In U.S. Pat. No. 4,961,917 a catalyst is described, which promotes $NO_x$ reduction by ammonia in a gaseous stream. The catalyst is a zeolite having a silica/alumina ratio of at least 10 and a pore structure interconnected in all three dimensions, and comprising an iron or copper promoter. However, there is no mention of a carrier, matrix or substrate, which is needed for use in bigger installations.

A catalyst for exhaust gas clean-up is disclosed in US 2001/0048971 (JP 11171668 A2), where a zeolite catalyst is formed on a mullite substrate in the shape as a honeycomb. The catalytic layer is formed during a heat treatment from the substrate and from a layer on it, such as an aqueous alkali solution. The heat treatment lasts up to 30 days, and the formed catalytic layer is typically 300-350 µm.

Also JP 10156181 discloses a catalyst for exhaust gas purification. A thin layer of active catalytic Pt, Rh, Ir and/or Pd supported by an oxide is applied on a porous ceramic material, typically cordierite. The ceramic material may be reinforced by inorganic fibres, and the whole catalyst is preferably in a shape of a honeycomb. Still, the metals from the platinum group are expensive.

It is an object of the invention to provide a method and a catalyst for efficient removal of $NO_x$ from exhaust gases at temperatures above 400° C., and where the catalyst shows improved strength and catalytic activity during quick heating or cooling.

Pursuant to the above object, the invention provides a method and a catalyst for removal of nitrogen oxides in a flue gas from a combustion engine or gas turbine by injecting a reducing agent and reducing the nitrogen oxides in the presence of a catalyst. The catalyst is a zeolite based catalyst on a corrugated monolithic substrate, the substrate having a wall density of at least 50 g/l but not more than 300 g/l and a porosity of at least 50%. The monolithic substrate is a paper of high silica content glass or a paper of E-glass fibre. The paper has a layer of diatomaceous earth or a layer of titania, and the catalyst is a Fe-β zeolite.

This catalyst has the advantage that the catalytic zeolite layer does not peel off from the monolithic substrate during start and stop of a combustion engine or a gas turbine. Simultaneously, the catalyst has shown to possess improved catalytic activity.

The invention provides a method and catalyst for high conversion of $NO_x$ and high resistance against frequent changes in temperature between cold and hot.

The catalytic material is applied on a monolithic substrate, which has the form of plane or corrugated plates. The substrate is made from sheets of E-glass fibres or from sheets of a glass with high silicon content and with a layer of $TiO_2$ or diatomaceous earth.

The high silicon content glass contains 94-95% by weight $SiO_2$, 4-5% by weight $Al_2O_3$ and some $Na_2O$, these fibres have a density of 2000-2200 g/l with a fibre diameter is 8-10 µm. An example is the commercially available SILEX staple fiber.

The E-glass contains 52-56% by weight $SiO_2$, 12-16% by weight $Al_2O_3$, 5-10% by weight $B_2O_3$, 0-1.5% by weight $TiO_2$, 0-5% by weight MgO, 16-25% by weight CaO, 0-2% by weight $K_2O/Na_2O$ and 0-0.8% by weight $Fe_2O_3$.

The material of the substrate is chosen, so the density of the substrate is at least 50 g/l, but not higher than 300 g/l material, and the porosity of the substrate wall is at least 50% by volume of the material.

The porosity of the monolithic substrate is obtained by the pores, which have a depth between 50 µm and 200 µm and a diameter between 1 µm and 30 µm.

The catalytic material is applied on the substrate as a layer with a thickness of 10-150 µm. The catalyst is a Fe-β zeolite.

The catalyst is applied by dipping the monolithic substrate into aqueous slurry of fine particles of zeolite, a binder and an anti-foam agent. The size of the particles is not more than 50 µm. The binder is preferably a silica sol binder, and the antifoam agent is a silicone antifoam agent.

The coated substrate is dried and subsequently calcinated at 400-650° C., preferably 540-560° C., most preferably at 550° C.

A catalyst element comprises layers of corrugated plates, which are separated from each other by plane plates. Catalyst elements can be in the form of boxes or cylinders.

One or more elements are installed in the flue gas duct from a combustion engine or gas turbine. A reducing agent is injected upstream of the catalyst, the agent can be ammonia, an aqueous solution of ammonia or of urea or other fluids, which will disintegrate into ammonia in the hot flue gas upstream of the catalyst.

Void of a catalyst element is 65-85%, preferably 70-80%, typically 75%.

The catalyst of the invention has proved to withstand the severe conditions, when an engine or a gas turbine is started or stopped and the flue gas temperature quickly increases or decreases. When the engine is heated up, the temperature will be from 400° C. to at least 620° C.

Self-igniting combustion engines operate with excess air, and thus the combustion creates poisonous nitrogen oxides, $NO_x$. The $NO_x$ can be removed from the flue gas by converting it to free nitrogen with a reducing agent often ammonia in the presence of a catalyst by selective, catalytic reduction:

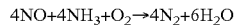

Catalysts, where zeolite is the active substance, are most often applied as a catalytic layer on a substrate. Such a layer is sensitive against thermal influence, as it may crack and peel-off. The thermal influence can be severe, as the temperature of a flue gas from a simple cycle peaker unit gas turbine may often increase from ambient to 400-620° C. in few minutes, when a cold gas turbine is started.

Figure 1:
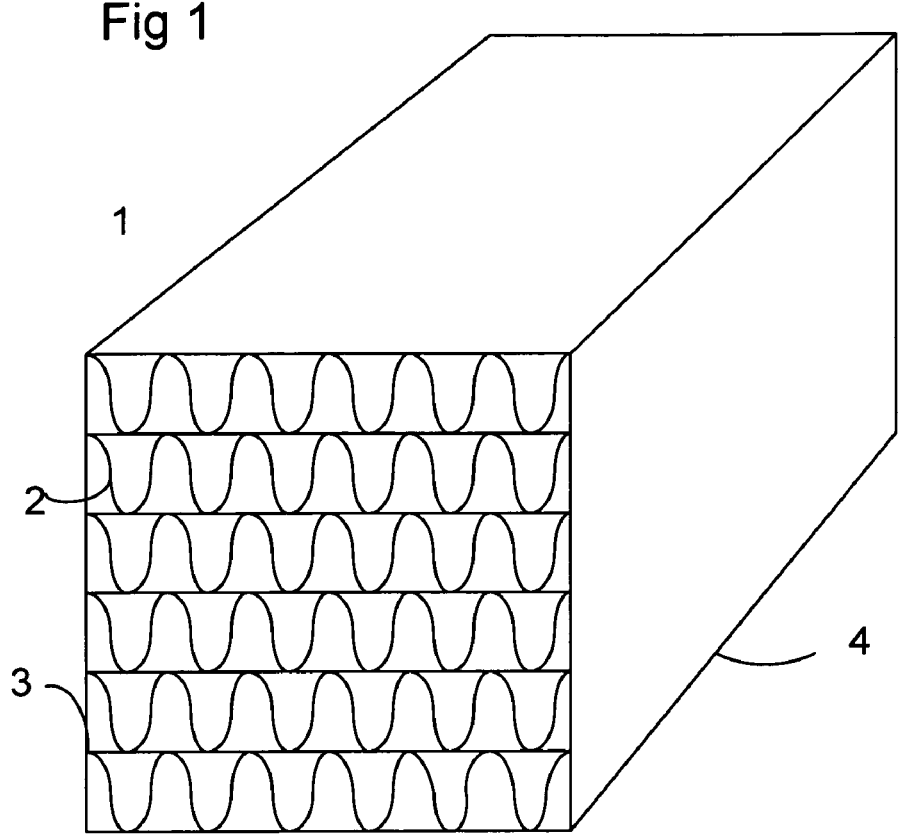
FIG. 1 is a schematic drawing showing a cross-sectional view of the catalyst to be used in the method of present invention.
Figure 2:
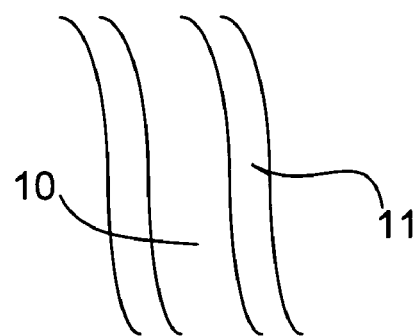
FIG. 2 is a schematic drawing showing a cross-sectional view of the wall of the catalyst to be used in the method of present invention.

A specific embodiment of the invention is shown by FIG. 1 and FIG. 2. FIG. 1 shows a catalyst 1 in shape of a box. It consists of corrugated plates 2, which are supported and separated from each other by plates 3, and the plates are mounted in a shell 4. Typical dimensions for a catalyst element are 466 mm×466 mm×322 mm or 466 mm×466 mm×560 mm, where 322 mm and 560 mm are the height (when the gas flows in a vertical direction).

FIG. 2 shows a part of a corrugated plate. The monolithic substrate 10 is a paper made from glass fibres with high silicon content. Alternatively, it is an E-glass fibre monolithic paper. The paper is coated with a layer of diatomaceous earth or with a layer of titania. The substrate 10 has a low density and a high porosity. The substrate plate has a thickness of 0.4 mm.

The separating plates, liners, have the same composition and thickness as the corrugated plates.

The zeolite based catalyst 11 is applied on the substrate 10 as a 10-150 μm thick layer.

Figure 5:
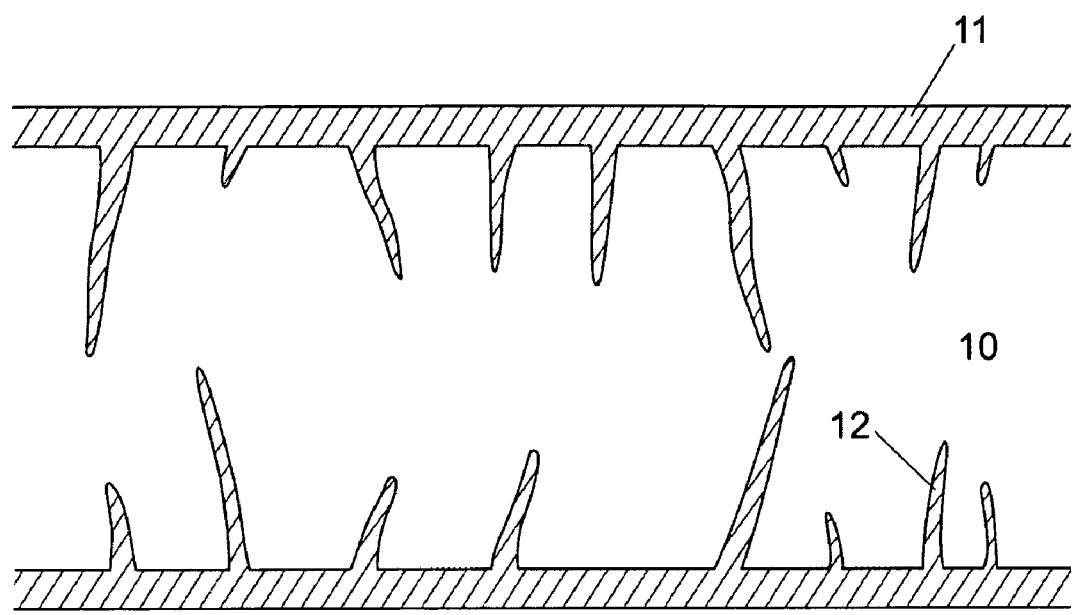
FIG. 5 is a schematic drawing showing a more detailed cross-sectional view of the wall of the catalyst of present invention.

The structure of the catalyst is shown in more detailed by FIG. 5. The substrate 10 covered by diatomaceous earth or titania is provided with a layer 11 of the zeolite based catalyst. The catalytic layer penetrates into the pores 12.

These pores are between 50 μm and 200 μm deep, most of the pores are about 100 μm. The diameter of the pores is between 1 μm and 30 μm, where the size of 10 μm is the typical size.

The present invention is especially useful for $NO_x$ removal from flue gas from gas turbines, combustion engines, where some examples are diesel engines, larger diesel driven ships, two stroke engines, diesel engine power generators often used as back-up, from incineration plants and from other flue gasses with high content of nitrogen oxides and having quick alterations of the temperature.

EXAMPLES

A number of catalyst elements were produced from a catalytic zeolite, Zeolyst CP-1724, which is a Fe-β zeolite, from a binder Levasil 200E/20%, which is a silica sol binder and from a silicone antifoam agent AT-47. 8000 g Levasil 200E/20%, 10 000 g Zeolyst CP-1724 and 80 g SE-47 were milled in a 50 l bucket together with 5 l glass beads Ø 3 mm for one hour. The obtained size of the particles was 50 μm. 7 300 g demineralised water was added resulting in slurry with 43% by weight solid particles. Then 8 500 g demineralised water was added to obtain a 33% by weight solid slurry.

The monolithic substrate was E-glass fibre paper with a layer of titania on it and formed as plane and corrugated plates with a thickness of 0.4 mm and a density of 200 g/l and a porosity of 70%.

The E-glass contained 54.3% by weight $SiO_2$, 15.2% by weight $Al_2O_3$, 6.48% by weight $B_2O_3$, 0.59% by weight $TiO_2$, 0.67% by weight MgO, 21.91% by weight CaO, 0.3% by weight $K_2O$, 0.5% by weight $Na_2O$.

The monolithic substrates were dipped in the slurry for 10 seconds, while they were totally covered by the slurry. Then they were lifted and the surplus slurry dripped off. The monoliths were simultaneously blown with air.

Between the dipping of monoliths, the content of solid particles in the slurry was checked and maintained at 33%.

After drying for two days the monoliths were calcinated 10 hours at 60° C., 2 hours at 100° C. and 2 hours at 550° C. The resulting catalytic layer was 60 μm thick.

The resulting catalyst monolith had a void of 75%.

Finally, the catalyst elements were encased in steel cassettes.

The catalyst, which was prepared as described above, was tested. Three of the prepared catalyst elements were tested at 550° C. in a flue gas stream containing 65 ppm $NO_R$. The obtained $NO_x$ conversion and corresponding $NH_3$ slip are given in Table 1.

TABLE 1

| Element | $NO_x$ conversion | $NH_3$ slip |
|---|---|---|
| 1 | 98.0% | 5 ppm |
| 2 | 94.5% | 5 ppm |
| 3 | 94.7% | 5 ppm |

A second test was performed in a flue gas containing 30 ppm $NO_x$ and ammonia was injected into the flue gas.

The contents of $NO_x$ and $NH_3$ were measured outlet of the catalyst at 200° C., 300° C., 350° C., 400° C., 500° C. and 550° C., and the $NO_x$ conversion and $NH_3$ slip were determined.

Figure 3:
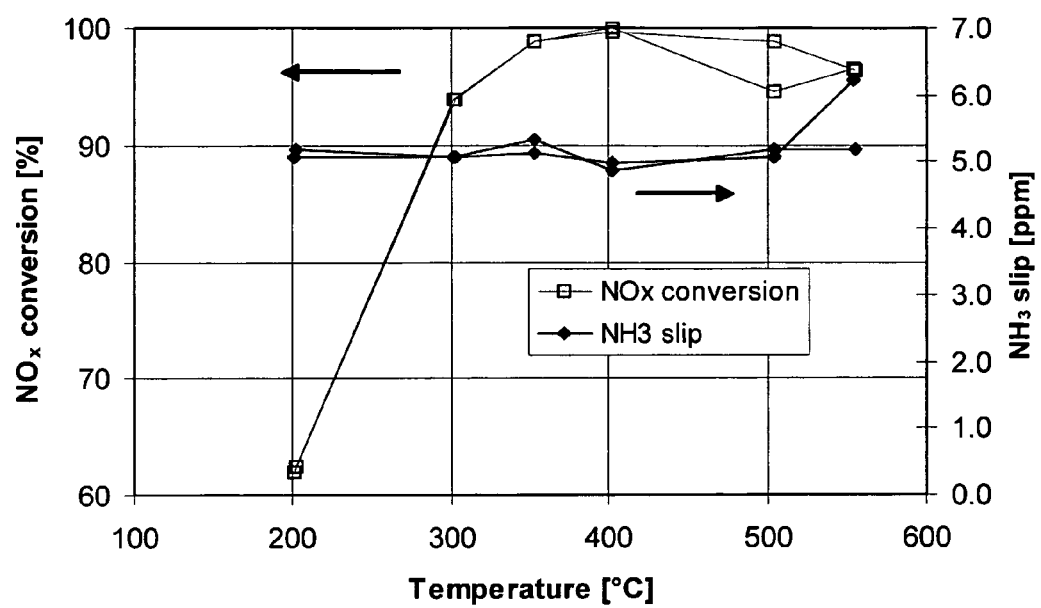
FIG. 3 is a diagram showing $NO_x$ conversion and $NH_3$ slip during purification according to the method of the invention.

The second test was conducted twice, and the results were plotted as shown in FIG. 3, where □ depict the $NO_x$ conversion, while and ♦ depicts the $NH_3$ slip at the six test temperatures.

It can be seen that 90-100% conversion was obtained and was highest between 350-550° C.

Further, a third test was run at 550° C. The necessary amount of ammonia was injected to obtain 25%, 70%, 95% and 97% conversion and the corresponding amounts of ammonia slip were measured.

Figure 4:
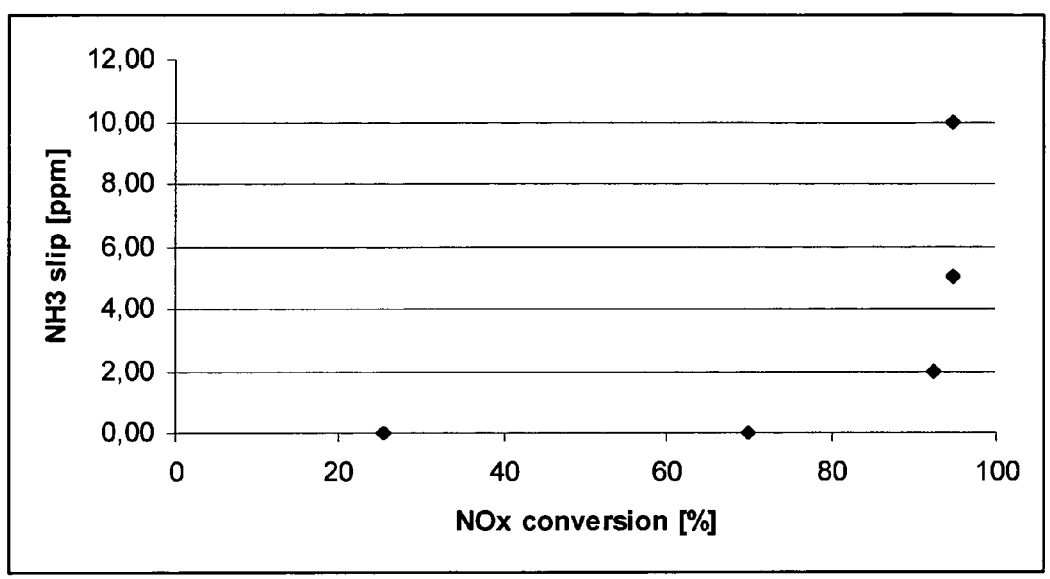
FIG. 4 is a diagram showing $NH_3$ slip during purification according to the method of the invention.

The results are shown in FIG. 4, where it is seen that it is only at above 90% conversion that ammonia slip can be detected. The slip is 2 ppm at 92% conversion and up to 10 ppm at 95% conversion, which is an excellent result. At these ammonia slips known technology only offers conversion at the order of 50%.

The invention claimed is:

1. A method for removal of nitrogen oxides in a combustion flue gas by injecting a reducing agent and reducing the nitrogen oxides in the presence of a catalyst being a zeolite based catalytic layer on a corrugated monolithic substrate, the substrate having a density between 50 g/l and 300 g/l and a porosity of at least 50% characterized in that the porosity of the monolithic substrate is formed by pores having a depth between 50 μm and 200 μm and a diameter between 1 μm and 30 μm 2. A method according to claim 1, wherein the monolithic substrate is a paper of high silica content glass or a paper of E-glass fiber, the paper is coated with a layer of diatomaceous earth or with a layer of titania, and wherein the catalytic layer is a Fe-β zeolite.

3. A method according to claim 1, wherein the reducing agent is a liquid, which disintegrates into ammonia in the flue gas.

4. A method according to claim 1, wherein the reducing agent is ammonia, an aqueous solution of ammonia, or an aqueous solution of urea.

5. A method according to claim 1, wherein the removal takes place at up to 400-620° C.

6. A method according to claim 1, wherein the flue gas is formed by combustion of hydrocarbons.

7. A method according to claim 6, wherein the combustion takes place in a combustion engine or a gas turbine.

8. A catalyst for removal of nitrogen oxides from a flue gas according to the method of claim 1.

9. A catalyst according to claim 8, wherein the monolithic substrate is a paper of high silica content glass or a paper of E-glass fiber, the paper is coated with a layer of diatomaceous earth or with a layer of titania, and the catalyst is a Fe-β zeolite, the high silica content glass contains 94-95 wt % $SiO_2$, 4-5 wt % $Al_2O_3$, some $Na_2O$, the fibers have a density of 2000-2200 g/l and diameter of 8-10 μm, and the E-glass contains 52-56% by weight $SiO_2$, 12-16% by weight $Al_2O_3$, 5-10% by weight $B_2O_3$, 0-1.5% by weight $TiO_2$, 0-5% by weight MgO, 16-25% by weight CaO, 0-2% by weight $K_2O$/$Na_2O$, and 0-0.8% by weight $Fe_2O_3$.

10. A catalyst according to claim 8, wherein the catalytic layer is applied on the monolithic substrate as a layer with a thickness of 10-150 μm.

11. A catalyst according to claim 8, wherein the catalytic layer is applied on the monolithic substrate by dipping the substrate into an aqueous slurry of milled zeolite particles, binder and antifoam agent by drying and subsequently by calcination.

12. A catalyst according to claim 11, wherein the binder is a silica sol binder, the anti foam agent is a silicone antifoam agent and the particles in the slurry have a size of not more than 50 μm.

13. A catalyst according to claim 11, wherein the catalyst is calcinated at 400-650° C., preferably at 540-560° C.

14. A catalyst according to claim 8, wherein the catalyst has a void of at least 65% -85%, preferably 70% -80%.

15. A catalyst according to claim 8, wherein the porosity of the monolithic substrate is formed by pores having a depth between 50 μm and 200 μm and a diameter between 1 μm and 30 μm.

* * * * *